Dec. 29, 1953  C. E. MAIER ET AL  2,663,909
PRODUCTION OF CLOSURE SEALS BY PARTIALLY CURING
A CUSHION MATERIAL, AND THEREAFTER
SHAPING AND COMPLETING THE CURE
Filed Nov. 8, 1950
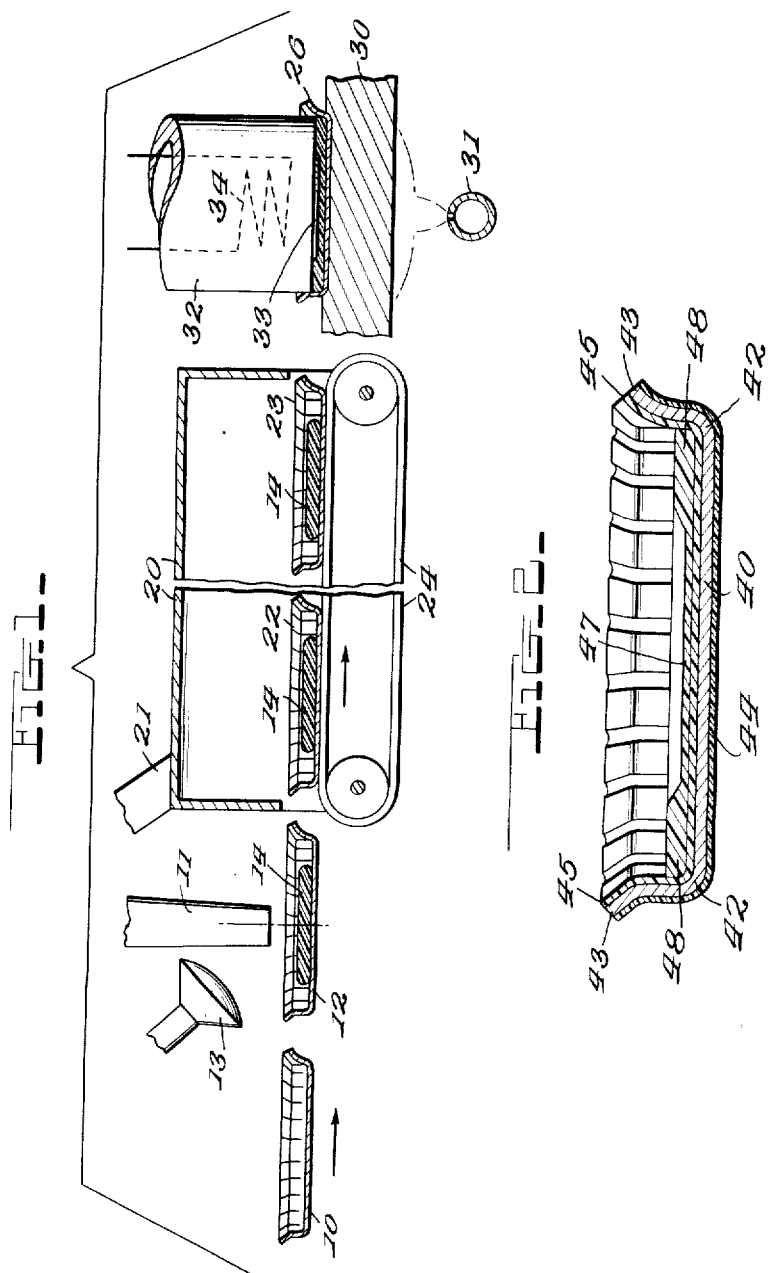
INVENTORS
Curtis E. Maier,
Halford E. Brockett and
Ralph A. Larson
BY Mason, Porter, Diller & Stewart,
ATTORNEYS Patented Dec. 29, 1953

2,663,909

UNITED STATES PATENT OFFICE 2,663,909

PRODUCTION OF CLOSURE SEALS BY PARTIALLY CURING A CUSHION MATERIAL AND THEREAFTER SHAPING AND COMPLETING THE CURE

Curtis E. Maier, Riverside, Halford E. Brockett, Lombard, and Ralph A. Larson, Chicago, Ill., assignors to Continental Can Company, Inc., New York, N. Y., a corporation of New York Application November 8, 1950, Serial No. 194,685

10 Claims. (Cl. 18—59)

This invention relates to the rapid production of closure seals for containers, including the forming of a shaped cushion pad or sealing member.

It has been proposed and is a practice to form such crown seals with the usual metal shell having a cushion pad therein, made of rubber composition, or of a like elastomer compound. However, when the composition is introduced in the form of a solution or emulsion, for the necessary liquidity of application, rotation of the shell is required for distribution, the composition is not form-maintaining in itself, a lengthy period is required for elimination of the solvent or like vehicle, and the distribution cannot be controlled with assured accuracy, nor can special contours in the sealing area or in the center be attained for maximum sealing efficiency and minimum use of material. Also, curing could only be effected after such solvent was eliminated. On the other hand, when the composition was introduced as a blank, care was required for producing the necessary adhesion in the crown shell and high pressures and temperatures were required for molding. Further, if the blank or disc is cut out from a web, either frame scrap loss or reworking cost is involved; and at least one additional operation is involved in cutting and placing the blank or disc.

When a crown seal is to be used for capping a bottle or other container, the cushion pad serves to conform to the possibly irregular lip of the container, providing a gasket between such lip and the closing face of the metal crown shell itself. The crown seal usually has a further demand upon it, being that of preventing contacts of the contents of the container with the metal at the inner face of the crown shell. These two requirements may be satisfied by materials insoluble and essentially non-permeable to the contents of the container, but in practice such materials do not demand as great a thickness for protection against penetration as is required for providing the necessary sealing gasket for conformation to the container lip. Accordingly, it is preferred in accordance with this invention to provide a crown seal in which the sealing member or cushion pad has a thick outer annular portion for engagement with the container lip, and a thinner central portion to provide the assurance against contact of the contents of the container with the metal of the crown shell.

It has been found that by using compositions formed by dispersing fine particles of a resin such as vinyl resin in a liquid plasticizer, it is feasible to deposit a quantity of such semiliquid, pasty dispersion in a closure shell, heat the closure shell with the mass therein and thereby partially cure the composition by causing the plasticizer to dissolve portions of the resin particles so that a form-maintaining body is produced, along with causing the plasticizer adjacent the shell to effect adhesion to the lacquer coating so that the mass adheres firmly to the shell: thereafter transferring the shell with the adherent mass therein to a heated platen, and employing a heated punch for shaping the mass to the desired contour while the heat from the shell and from the punch produce a continued diffusion or dissolution of the resin and plasticizer until these have formed a substantially uniform, thermo-plastic, shaped cushion pad which upon cooling maintains desirable characteristics of a tough resilient liner under the conditions of service. That is, the fusion or dissolution of the vinyl resin into the stated plasticizer, to provide the final cured mass, is accomplished in two steps; in the first of which a partial gelling or curing of the mass occurs, with production of adhesion, under the inexpensive conditions of a hot air oven, for example, wherewith the shell and mass may thereafter be handled as a unit without danger of accidental separation; and in the second of which the mass is shaped into the desired form and the final curing is accomplished.

In this practice, the partially cured or gelled mass can be shaped to an optimum contour for economy of material and performance as a seal, under appropriate and easily attainable temperatures, and under commercially feasible conditions of pressure and time; and there is no loss of material, because the measured volume of liquid is delivered into each shell, no volatile component need be driven off, and the final volume is essentially the same as the measured original volume.

When the partial curing or gelling has been effected, the closure shell and the mass form a unit whose parts adhere together, and which can be stored, shipped and handled without the difficulties of flow or transfer of the mass as deposited. Thus, the shell with the soft deposited mass can be subjected immediately to the action of a hot punch for shaping and gelation, as set out and claimed in the copending applications of Curtis E. Maier, Serial No. 176,217, filed July 27, 1950; and Serial No. 176,218, filed July 27, 1950; but such assemblies cannot be handled roughly or tilted, or have the mass contacted by a foreign body: whereas with the instant method, the aforesaid units can be stored in bulk, and then delivered to a mechanism having a heated shaping punch by hoppering and feeding. Hence, a stoppage in one operation does not interfere with the other operation; and indeed the operations can be conducted at separate points if so desired. Conversely, by limiting the curing to that of eliminating stickiness and of assuring form maintenance as distinguished from the initial ability to flow, the temperature and pressure demands for shaping are held low.

An example of practice of the invention is shown on the accompanying drawing, in which Fig. 1 is a diagrammatic showing of the successive steps of producing a crown seal or cap according to this invention. Fig. 2 is an axial cross-section through such a crown seal.

In Fig. 1, a series of crown shells are shown advancing through the several steps of operation.

The crown shells may be prepared in the customary fashion by providing a sheet of steel or tin plate, with lithographed advertising matter on one face, and with a coating of a lacquer at the other or inner face, as more closely described hereinafter. The sheets thus coated and baked are then passed through punch presses in the presently customary fashion for example, whereby several hundred such crown shells are blanked and formed from a single sheet.

The composition of resin particles with plasticizer, the resin being essentially insoluble in the plasticizer at room temperature but soluble therein at an elevated temperature so that upon cooling a form-maintaining permanent, rubber-like gel results, is called a "paste-resin" in the plastics industry. The plasticizer liquid is not an active solvent of the resin at a temperature of fluid flow of the resin paste, such as at room temperature or at a temperature of 110 to 115° F., but is an active solvent thereof at a higher and fluxing temperature such as 275° to 375° F. For present purposes, they are characterized in that they contain no foreign material as a fluidifying agent, which must be expelled to produce the final gel: and since the action is largely one of fluxing or inter-solution of the resin and plasticizer, there is essentially no change in volume as the hot mixture changes to the gel form.

Such crown shells may then be passed through the steps of the present procedure, as indicated in Fig. 1 by the successive crown shells 10, 12, 22, 23 and 26. The first step, after a crown shell such as 10 is introduced to the procedure, is that of depositing in the concave-upward crown shell, illustratively crown shell 12, a quantity of the illustrative mixture of vinyl resin and plasticizer. The present preference is for the crown shell to be cold when the deposit begins; but it may be pre-heated if desired. This deposit may be accomplished by warming the material to a temperature of about 110° F. to 115° F., and then passing it to and through the nozzle 11 and thus providing the deposit of a standard quantity 14 in the crown shell 12. The nozzle and material may be kept warm by suitable means, such as infra-red radiation from the electric bulb 13. It has been found that a volume of 100 to 400 cubic millimeters is a desirable quantity, the smaller volumes being usable with short-skirt shells, and the larger volumes with the so-called standard-skirt shells; it being understood that smaller volumes are permissible when the containers to be sealed are known to have close tolerances for irregular lip surfaces as compared with some bottles where greater allowances by greater thicknesses of cushions and corresponding larger volumes of paste are required. In general, the lower limit of volume for a specific employment depends upon the degree of sealing efficiency required as the sealing efficiency decreases with the volume of compound, particularly in the lower ranges. The upper limit depends upon the amount of compound that can be put into the shell without interfering with the sealing, and on economics. Under these conditions, the introduced material 14 forms a button of about three-eighths of an inch to three-quarters of an inch diameter at the center of the cap, as indicated by the mass 14.

The next operation is that of passing the crown shell, illustratively the crown shells 22, 23, through a heated zone, illustratively shown as the hot air oven 20 having a hot air inlet 21. This oven has the conveyor belt 24 for advancing the crown shells, each with its charge 14 of material, from an inlet to an outlet. Thereby, the mass of material 14 is heated until the plasticizer dissolves parts of the vinyl resin particles, thus attaining a greater viscosity and providing the mass of material with a form-maintaining consistency. The plasticizer in contact with the lacquer coating inside of the respective crown shell also produces a union between the mass of material 14 and the lacquer coating on the crown shell, so that adhesion occurs.

This dissolution is interrupted and the oven treatment terminated before diffusion has far advanced, wherewith the mass of material 14 remains easily thermo-plastic and capable of shaping without using destructively high temperatures or high pressures.

A satisfactory stage of pre-curing has been attained when the mass 14 is no longer sticky or tacky at its surfaces and when it is form-maintaining as removed from the oven. The heating conditions of temperature and time for this effect likewise lead to a satisfactory state of adhesion in the shell. The shells having the partially cured masses adherent thereto can be hoppered and handled in conventional crown feeding equipment without sticking or smearing of the mass onto other shells or appreciable damage to the mass.

As a crown shell leaves the oven 20, it is subjected to further heating and shaping operations, which may be accomplished by immediately placing it, such as the crown shell 26, in a cavity in a hot platen 30 which is heated as by burning gases coming from the supply pipe 31. A punch 32 is brought down into forcible contact with the mass of material in the crown shell 26 acting as a bottom mold, and produces a shaping of the same in counterpart to the shape of the lower end of the punch: in the illustrated form, a central concentric projection 33 causes the central part of the thermo-plastic mass to be forced radially outward, while leaving a thin central web, and establishing a thicker surrounding annular portion. This punch 32 is heated, as illustrated by the electric heating wire 34.

While the crown shell is being heated from the platen 30, and therewith transferring heat into the mass of material being shaped in the crown shell, and this mass is being heated from the punch 32, the plasticizer continues to take up the resin, with an intimate diffusion, so that the shaped mass is brought to a uniform condition. The shaping is accomplished quickly, and the punch dwells in position until the curing is completed. During this hot shaping and final curing, the radial distribution of the material into its intended shape is accompanied by adhesion of the displaced material to the shell, so that the shaped pad is adherent over essentially its entire surface of contact with the shell.

The crown shell with its shaped and completely cured cushion pad therein is removed from the punch 32 and platen 30, and upon cooling is ready for use.

The completed article has the parts shown in Fig. 2, in which the circular end portion 40 is bounded by a smoothly curved top corner radius 42 leading to the corrugated skirt portion 43. The outer surface has a decorative coating 44 which has been baked until it is free of tackiness or flow at the temperatures of operation during the process and steps shown in Fig. 1. The inner surface has a lacquer coating 45, and with the shaped mass of cushion material bonded by interfusion with this lacquer. The shaped mass itself has a thin central web portion 47 opposite the hole in the mouth of the container, and a thicker annular portion 48 for contact with the lip of the container. In practice, it is preferred to have the thickness of the web portion 47 about 4 to 10 thousandths of an inch, while the annular portion may have a thickness of 12 to 40 thousandths of an inch.

The lacquer for the inner surface of such compound lined crowns may desirably be selected in accordance with the material employed for the compound and in accordance with the intended contents of the container to be sealed. For example, a vinyl lacquer prepared as described in the Maier et al. Patent 2,380,456, with 80 per cent of vinyl chloride-vinyl acetate copolymer resin and 20 per cent of oleoresinous modifier produces a satisfactory adhesion. When the crown seals are to be employed with carbonated beverages, it is preferred to employ a trimer lacquer having a corresponding solids formulation of 80 per cent of vinyl chloride-vinyl acetate copolymerized in the presence of maleic anhydride as a modifier, for example, in the respective ratios of 87:12:1, together with 20 per cent of a phenolic resin derived from ortho-cresol and formaldehyde. Either of these lacquers can be prepared in an organic solvent, such as 70 per cent xylol and 30 per cent isophorone, with 20 per cent solids, for roller coating. For spraying, more volatile solvents, such as toluol, methyl ethyl ketone, and methyl isobutyl ketone, can be used. After applying and drying, the coating is baked.

The composition forming the principal mass of the shaped cushion pad has two basic ingredients comprising an elastomer and a plasticizer therefor, the plasticizer being so selected that the elastomer is essentially insoluble therein at room temperature, but is soluble at some elevated temperature. These two ingredients are ground together to form a paste which is flowable under the conditions stated, and may also include other components such as inert fillers to limit cutting, pigments, modifying resins to assist control of physical properties, stabilizers for the resins and other components, waxes to prevent blocking and to reduce moisture vapor and gas permeability, etc. However, these other materials are not essential in the composition, but may be employed to contribute to the desired properties for the particular employment. In general, the formulations described in the Foye United States Patent 2,489,407 or in South African Patent 2556/47 may be employed, noting that the filler and other components may be omitted if so desired.

The elastomer component may be a vinyl resin of the class inclusive of polyvinyl chloride, copolymers of vinyl chloride and vinyl acetate such as the 97:3 per cent copolymer, vinylidene chloride polymers, and copolymers of vinyl chloride and vinylidene chloride. The chloride content should be high, when the seal is to resist aqueous liquids; such as 90 per cent vinyl chloride in a copolymer.

Among the plasticizers useful are those which have a very slow wetting or dissolving action upon the selected vinyl resin at room temperature and at temperatures up to around 115° F. The ester type plasticizers of vinyl resins have this general characteristic, and require higher temperatures for producing penetration, diffusion, and intersolution. A preferred plasticizer is dioctyl phthalate; others are dibutyl phthalate, dioctyl sebacate, and tricresyl phosphate. The plasticizer should be liquid at the temperature of use.

The ratio of the elastomer and plasticizer, by weight, may be from 6:4 to 4:6, with preference for a ratio of about 1:1.

Such compositions can be introduced at about 110° F. to 115° F. through the nozzle 11, and then be given a partial curing or pre-gelling in the oven 20, and thereafter be shaped and completely cured by the action of the heated platen 30 and the heated punch 32, resulting in the production of a resilient, tough, plasticized resin mass, having an elongation at break, when a specimen is tested for strength, of 150 to 340 per cent, for example, with the usual values being above 250 per cent.

Illustrative of the conditions for the pre-gelling operation is the employment of a hot air oven having a high velocity circulation of air for heating the compound at a temperature of 275° F. to 325° F., the time in the oven being from 30 to 60 seconds. For example, a time of 45 seconds at 300° F. is satisfactory with a volume of 200 cubic millimeters.

The temperature and pressure employed for the shaping and final curing depends upon the material of the compound, the degree of curing effected in the oven 20, and upon the shape of the crown shell and the shape to be given the cushion pad. For the crown shell having a one-sixteenth inch radius at the top corner, 25 to 75 pounds per square inch pressures are useful with sizes and shapes of cushion pad as illustrated in describing Fig. 2. Correspondingly, when the top corner radius of the crown shell is three thirty-seconds of an inch, pressures of 125 to 175 pounds per square inch should be used in forming a plasticized top ring or annulus. Higher pressures can be used, but it is desired to avoid excessive pressures in order to keep machine costs low.

The temperature employed for the molding depends in practice upon the characteristics of the original coating lacquer 45 and the composition for the cushion material. When this lacquer is of vinyl chloride-acetate polymer, with the oleoresinous modifier as described above, the temperature can range from 300° F. to 350° F.: when the so-called trimer of vinyl chloride-acetate and maleic anhydride is employed, the temperature may range from 325° F. to 375° F. It is desirable to use elevated temperatures, in a production machine, to keep the time and pressure low, for economy.

The time required for molding, following the pre-gelling in the oven, is from 3 to 4 seconds. It will be noted that for economy this time should be kept as short as possible; but no serious deterioration occurs even though the material is held for a far longer time in the heated condition.

The time and temperature are inter-related, and it was found satisfactory to complete the curing in the mold at 325° F. and under 50 pounds per square inch, in 6 to 30 seconds; or at 375° F. with 100 pounds per square inch pressure for 4 to 30 seconds.

An optimum condition, with a crown shell having a one-sixteenth top corner radius, the cushion pad having a shape as indicated in Fig. 2, with the inside lacquer coating 45 of the trimer resin, was a combination of 375° F., 75 pounds per square inch, and 6 seconds for shaping and final curing. When the crown shell had a three thirty-seconds inch top corner radius, with the same pad shaping and internal lacquer, the combination of 375° F., 150 pounds per square inch, and 6 seconds for shaping and final curing, was satisfactory.

The paste resin as originally deposited is a semi-fluid sticky mass which flattens out by gravity into a button and clings to the crown shell, but may be wiped off, and parts of the mass are removed upon contact of any solid object; also, flow occurs if the shell is tilted, so that the preferred uniform concentric disposition is lost. Hence, at this stage the crown shell with its deposit cannot be handled roughly nor can the mass be brought in contact with another crown shell. After the pre-curing stage in the oven 20, however, the sticky deposited composition has changed to a physical condition wherein the surface is no longer tacky and the mass cannot be gouged away by simple contact, and therewith the wet clinging mass has passed to a state of adhesion which prevents accidental separation; and flow no longer occurs if the shell is left in tilted condition.

While the invention has been illustrated by a practice of making crown seals with lacquered metal shells having corrugated skirts of circular outline, and employing the stated materials and conditions, it will be understood that it may be embodied in other forms within the scope of the appended claims.

We claim:

1. The method of forming sealing pads for closure seals, which comprises depositing in a closure shell a quantity of a semi-liquid paste composition consisting for essential components thereof of a normally liquid plasticizer and a finely divided resin which is paste-forming with the plasticizer at a temperature below the fluxing temperature of the resin-plasticizer components, said composition being capable upon being heated to the fluxing temperature of the resin-plasticizer components thereof of forming a permanent rubbery gel, heating the deposited mass until it is non-tacky, pressing a heated forming plunger against the non-tacky mass prior to completed curing thereof and thereby shaping the same into a sealing pad of the desired contour, and maintaining said shaped pad under heat and the pressure of said plunger and at a fluxing temperature until the said resin-plasticizer components have completely fluxed together.

2. The method of forming sealing pads for closure seals, comprising discharging into the closure shell a quantity of a semi-liquid pasty material comprising particles of a resin dispersed in a fluid resin plasticizer, heating the said material in the shell for producing adhesion to the shell and a partial curing by partial dissolution of the resin particles in the plasticizer, thereafter pressing a heated forming plunger against the partially cured material while the closure shell is on a heated support for shaping the material into a sealing pad, and maintaining said shaped pad under pressure and at a fluxing temperature until the resin particles have completely dissolved into the plasticizer and produced an essentially uniform mass adherent to the shell.

3. The method of forming sealing pads for closure seals, comprising discharging into the closure shell a quantity of a semi-liquid pasty material comprising particles of a resin dispersed in a fluid resin plasticizer, heating the said material in the shell for producing adhesion to the shell and a partial dissolution of the resin particles in the plasticizer, thereafter pressing a heated forming plunger against the material while the closure shell is on a heated support for producing radial movement of parts of the mass of material and thereby shaping the same into a sealing pad having an annular thickened portion and a central thin portion, and maintaining said shaped pad under pressure and at a fluxing temperature until the resin particles have completely dissolved into the plasticizer and the shaped pad has adhered to the closure shell.

4. The method of making crown seals having therein a shaped and cured cushion pad, which comprises providing a crown shell having an internal lacquer coating exhibiting a vinyl resin at the exposed side thereof, depositing in the crown shell and upon said exposed coating face thereof a quantity of a mass comprising particles of a vinyl resin dispersed in a fluid vinyl resin plasticizer, heating the mass to a fluxing temperature and until the exposed surface is non-tacky, and thereafter pressing a heated forming surface upon the exposed face of the mass after the same has become non-tacky and prior to complete dissolution of the resin particles into the plasticizer for distributing and shaping the mass in the crown shell and therewith heating to effect a completed dissolution of the vinyl resin particles into the plasticizer to constitute an essentially uniform mass.

5. The method of making closure seals, which comprises depositing at a temperature of fluid flow into a closure shell a quantity of resin paste having as dominant gel-forming elements thereof finely divided resin particles suspended in a resin plasticizer which is not an active solvent of the resin at said temperature of fluid flow of the resin paste and which is an active solvent thereof at a higher and fluxing temperature, heating the mass until it ceases to be tacky and is form-maintaining at the temperature of heating, pressing a heated forming surface against the partially cured deposit and thereby shaping the same, and then maintaining the deposit at a fluxing temperature and essentially confined between the shell and said surface until the resin and plasticizer have completely fluxed together and constitute an essentially uniform gel.

6. The method of forming sealing pads for crown seals, which comprises depositing at a temperature of about 110 to 115° F. into a metal crown shell a quantity of 100 to 400 cubic millimeters of a semi-liquid paste composition consisting for essential components thereof of a finely divided vinyl resin and a normally liquid ester plasticizer of the vinyl resin which forms a fluid paste with the resin at said temperature, said composition being capable upon being heated to a fluxing temperature of 275° to 375° F. and thereafter being cooled of forming a permanent rubbery gel, heating the deposit at a temperature of about 275° F. to 325° F. for 30 to 60 seconds whereby to effect partial curing of the same, thereafter pressing a heated forming plunger against the deposited and partly cured material for shaping the same into a sealing pad of the desired contour in contact with and adherent to the shell, and maintaining said shaped pad in contact with the plunger at a temperature of 300 to 375° F. and under a pressure of at least 25 pounds per square inch until the said resin and plasticizer components have completely fluxed together.

7. The method of making crown seals having therein a shaped and cured cushion pad, which comprises providing a crown shell having an internal lacquer coating, depositing in the crown shell and upon a part of said coating thereof a quantity of a mass comprising particles of a resin dispersed in a fluid plasticizer of the resin, heating the mass, heating the said material in the shell for producing adhesion to the shell and a partial dissolution of the resin particles in the plasticizer, and thereafter pressing a heated forming surface upon the partially cured mass in the shell while heating to a temperature of at least 275° F. and thereby distributing and shaping the mass and completing adhesion thereof to said lacquer coating and accomplishing the fluxing of the resin particles with the plasticizer to constitute an essentially uniform mass.

8. The method of forming sealing pads for crown seals, comprising discharging into and adjacent the center of an internally lacquered crown shell 100 to 400 cubic millimeters of a semi-liquid pasty material comprising particles of a resin dispersed in a fluid resin plasticizer, heating the said material in the shell for producing adhesion to the shell and a partial dissolution of the resin particles in the plasticizer, thereafter pressing a heated forming plunger against the material while the crown shell is on a heated support for distributing and shaping the material into a sealing pad and maintaining the material into a sealing pad and maintaining said shaped pad confined and at a fluxing temperature of 300 to 375° F. until the resin particles have completely dissolved into the plasticizer and the shaped pad adheres for essentially its entire area of contact with the crown shell.

9. The method of forming sealing pads for crown seals, comprising discharging into and adjacent the center of an internally lacquered crown shell 100 to 400 cubic millimeters of a semi-liquid pasty material comprising particles of a resin dispersed in a fluid resin plasticizer, heating the said material in the shell for producing adhesion to the shell and a partial dissolution of the resin particles in the plasticizer, thereafter pressing a heated forming plunger against the material while the crown shell is on a heated support for distributing and shaping the material into a sealing pad having an annular thickened portion and a central thin portion, and maintaining said shaped pad at a fluxing temperature until the resin particles have dissolved into the plasticizer and the shaped pad has adhered to the crown shell.

10. The method of making closure seals, which comprises depositing at a temperature of fluid flow into a cold internally-lacquered closure shell a quantity of resin paste having as dominant gel-forming elements thereof finely divided resin particles suspended in a resin plasticizer which is not an active solvent of the resin at said temperature of fluid flow of the resin paste and which is an active solvent thereof at a higher and fluxing temperature, heating the said material in the shell for producing adhesion to the shell and a partial dissolution of the resin particles in the plasticizer, thereafter pressing a heated forming surface against the deposit and thereby distributing and shaping the same, and then heating the shell and surface and maintaining the deposit at a fluxing temperature and confined between the shell and said surface until the resin and plasticizer have fluxed together and constitute a form-maintaining gel adherent to said shell.

CURTIS E. MAIER.
HALFORD E. BROCKETT.
RALPH A. LARSON.

References Cited in the file of this patent

UNITED STATES PATENTS

| Number | Name | Date |
|---|---|---|
| 1,373,060 | Eberhart | Mar. 29, 1921 |
| 1,486,937 | Taliaferro | Mar. 18, 1924 |
| 2,144,495 | Humphrey | Jan. 17, 1939 |

FOREIGN PATENTS

| Number | Country | Date |
|---|---|---|
| 500,298 | Great Britain | Feb. 7, 1939 |

Dedication 2,663,909.—*Curtis E. Maier*, Riverside, *Halford E. Brockett*, Lombard, and *Ralph A. Larson*, Chicago, Ill. PRODUCTION OF CLOSURE SEALS BY PARTIALLY CURING A CUSHION MATERIAL AND THEREAFTER SHAPING AND COMPLETING THE CURE. Patent dated Dec. 29, 1953. Dedication filed June 8, 1965, by the assignee, *Continental Can Company, Inc.*

Hereby dedicates to the public the term of said patent subsequent to October 13, 1970.

[*Official Gazette Aug. 10, 1965.*]